(12) United States Patent
Lee et al.

(10) Patent No.: US 12,352,716 B2
(45) Date of Patent: Jul. 8, 2025

(54) METHOD FOR INSPECTING WELD STATES OF BATTERY

(71) Applicant: LG ENERGY SOLUTION, LTD., Seoul (KR)

(72) Inventors: Junghoon Lee, Daejeon (KR); Su Taek Jung, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 0 days.

(21) Appl. No.: 18/035,185

(22) PCT Filed: Jul. 5, 2022

(86) PCT No.: PCT/KR2022/009652
§ 371 (c)(1),
(2) Date: May 3, 2023

(87) PCT Pub. No.: WO2023/282575
PCT Pub. Date: Jan. 12, 2023

(65) Prior Publication Data
US 2024/0011927 A1    Jan. 11, 2024

(30) Foreign Application Priority Data

Jul. 8, 2021 (KR) .................. 10-2021-0089920

(51) Int. Cl.
*G01N 27/04* (2006.01)
*H01M 10/04* (2006.01)
(Continued)

(52) U.S. Cl.
CPC ...... *G01N 27/041* (2013.01); *H01M 10/0422* (2013.01); *H01M 10/0431* (2013.01);
(Continued)

(58) Field of Classification Search
CPC ......... G01N 27/04; G01N 27/20; B23K 31/12
(Continued)

(56) References Cited

U.S. PATENT DOCUMENTS 7,776,469 B2 * 8/2010 Kim .................. H01M 50/536
429/169
2005/0287433 A1 * 12/2005 Kim .................. H01M 50/538
429/181
(Continued)

FOREIGN PATENT DOCUMENTS

| CN | 108362739 A | 8/2018 |
| JP | H11-067187 A | 3/1999 |

(Continued)

OTHER PUBLICATIONS

He, Xu. "Single Sided Bonding of Cylindrical Battery Cells." (2021). (Year: 2021).*
(Continued)

*Primary Examiner* — Christopher P McAndrew
(74) *Attorney, Agent, or Firm* — Bryan Cave Leighton Paisner LLP (57) ABSTRACT

A method is provided to inspect weld states of a cylindrical battery. The cylindrical battery may include: a cylindrical jelly roll in which a first current collector, a first separator, a second current collector, and a second separator are sequentially stacked and wound, so as to extend in the vertical direction; a first collector plate which is coupled to the upper end of the jelly roll and to the lower surface of which the first current collector is firstly welded; and a second collector plate which is coupled to the lower end of the jelly roll and to the upper surface of which the second current collector is secondly welded. The method may include a first measurement step, a second measurement step, a first weld determination step, and a second weld determination step.

7 Claims, 6 Drawing Sheets

(51) Int. Cl.
*H01M 50/107* (2021.01)
*H01M 50/536* (2021.01)
*H01M 50/609* (2021.01)

(52) U.S. Cl.
CPC ....... *H01M 50/107* (2021.01); *H01M 50/536* (2021.01); *H01M 50/609* (2021.01)

(58) Field of Classification Search
USPC ......................................................... 324/693
See application file for complete search history.

(56) References Cited

U.S. PATENT DOCUMENTS

| | | | | |
|---|---|---|---|---|
| 2013/0273401 | A1* | 10/2013 | Lee | H01M 50/198 429/185 |
| 2014/0302384 | A1* | 10/2014 | Park | H01M 50/124 156/185 |
| 2015/0104681 | A1* | 4/2015 | Wang | H01M 10/0585 429/61 |
| 2017/0322168 | A1 | 11/2017 | Lupienski et al. | |
| 2021/0167399 | A1* | 6/2021 | Hu | H01M 4/661 |
| 2022/0152725 | A1 | 5/2022 | Koo et al. | |

FOREIGN PATENT DOCUMENTS

| | | |
|---|---|---|
| JP | 2000-268887 A | 9/2000 |
| JP | 2006-313794 A | 11/2006 |
| JP | 4330690 B2 | 9/2009 |
| JP | 2009-152350 A | 10/2009 |
| JP | 4575546 B2 | 11/2010 |
| JP | 2019-060769 A | 4/2019 |
| KR | 10-2007-0044647 A | 4/2007 |
| KR | 10-2017-0125707 A | 11/2017 |
| KR | 10-1887148 A1 | 8/2018 |
| KR | 10-1887148 B1 | 8/2018 |
| KR | 10-2020-0058399 A | 5/2020 |
| KR | 10-2021-0014482 A | 2/2021 |
| WO | 2009-153962 A1 | 12/2009 |

OTHER PUBLICATIONS

Cherry, B. Lloyd. "Dynamic resistance test of spot welds." IEEE Transactions on Communication and Electronics 82.2 (1963): 121-123. (Year: 1963).*
International Search Report (with partial translation) dated Oct. 21, 2022, issued in corresponding Korean Patent Application No. PCT/KR2022/009652.

* cited by examiner

METHOD FOR INSPECTING WELD STATES OF BATTERY

TECHNICAL FIELD

This application claims the benefit of priority based on Korean Patent Application No. 10-2021-0089920 filed on Jul. 8, 2021, the entire disclosure of which is incorporated herein by reference for all purposes.

The present disclosure relates to a method for inspecting a welding state of a battery, and more specifically, to a method for inspecting a welding state of a battery which is capable of quickly and non-destructively inspecting a state of electrodes of a cylindrical battery.

BACKGROUND ART

In general, a current collector to which an active material is applied and an electrode tab for electrical connection to external electrical devices are connected together both physically and electrically in a battery by welding the current collector and the electrode tab. In the case of a poor welding state, the battery's operating efficiency is reduced, and depending on the situation, the poor welding state may result in damages to the battery. Therefore, it is crucial to accurately determine the welding state.

For a cylindrical battery, welds exist between the current collector and the electrode tab as well as between the electrode tab and a can. In order to inspect the welding states of these welds, a destructive inspection method for manually sampling welding regions has been performed.

Therefore, there existed a problem with the conventional method such as lots on hold when an issue with a welding state arises.

In order to solve this problem, there is a need for a new inspection method which is capable of in-line total inspection.

DISCLOSURE OF INVENTION

Technical Goals

The present disclosure relates to a method for inspecting a welding state of a battery, and an object is to provide a method for inspecting a welding state of a battery which is capable of quickly and non-destructively inspecting a state of electrodes of a cylindrical battery.

Technical objects to be achieved by the present disclosure are not limited to the technical problems as mentioned above, and other technical objects not mentioned will be clearly understood from the description below by those of ordinary skill in the art to which the present disclosure pertains.

Technical Solutions

A method for inspecting a welding state of a battery of an example embodiment includes: a first measuring step of measuring resistance by contacting a first probe unit with an upper surface of a first current collector plate; a second measuring step of measuring resistance by contacting a second probe unit with a lower surface of a second current collector plate; a first welding determining step of determining a state of the first welding based on the resistance value measured in the first measuring step; and a second welding determining step of determining a state of the second welding based on the resistance value measured in the second measuring step.

Advantageous Effects

According to a method for inspecting a welding state of a battery of example embodiments of the present disclosure, it is possible to perform in-line total inspection, thereby improving the quality of battery production and removing defective batteries in advance.

According to a method for inspecting a welding state of a battery of example embodiments of the present disclosure, it is possible to identify welding qualities within a short time period.

EXAMPLE EMBODIMENTS AND ASPECTS

A method for inspecting a welding state of a battery of an example embodiment may include: a first measuring step of measuring resistance by contacting a first probe unit with an upper surface of a first current collector plate; a second measuring step of measuring resistance by contacting a second probe unit with a lower surface of a second current collector plate; a first welding determining step of determining a state of the first welding based on a resistance value measured in the first measuring step; and a second welding determining step of determining a state of the second welding based on a resistance value measured in the second measuring step.

In the method for inspecting a welding state of a battery of an example embodiment, the first probe unit may include a plurality of first probes provided in a plurality of pairs, and the second probe unit may include a plurality of second probes provided in a plurality of pairs, wherein in the first measuring step, the plurality of first probes may contact different respective points of the first current collector plate to measure resistance values, and in the second measuring step, the plurality of second probes may contact different respective points of the second current collector plate to measure resistance values.

In the method for inspecting a welding state of a battery of an example embodiment, the first current collector plate may be provided in a cross shape in which a first linear region and a second linear region intersect with each other, and the second current collector plate may be provided in a cross shape in which a third linear region and a fourth linear region intersect with each other, wherein a region in which the first linear region and the second linear region overlap may be defined as a first intersection region, and a region in which the third linear region and the fourth linear region overlap may be defined as a second intersection region, wherein in the first measuring step, at least a pair of first probes among the plurality of first probes may measure a first resistance value by contacting the first linear region with the first intersection region interposed therebetween, and at least another pair of first probes among the plurality of first probes may measure a second resistance value by contacting a second linear region with the first intersection region interposed therebetween, and wherein in the second measuring step, at least a pair of second probes among the plurality of second probes may measure a third resistance value by contacting the third linear region with the second intersection region interposed therebetween, and at least another pair of second probes among the plurality of second probes may measure a fourth resistance value by contacting a fourth linear region with the second intersection region interposed therebetween.

In the first welding determining step of the method for inspecting a welding state of a battery of an example embodiment, a state of the first welding may be determined based on the first resistance value and the second resistance value, and in the second welding determining step, a state of the second welding may be determined based on the third resistance value and the fourth resistance value.

In the method for inspecting a welding state of a battery of an example embodiment, an arc-shaped adhesive portion may be provided on an edge of the first current collector, and the cylindrical battery may further include a can housing configured to house the jelly roll inside, wherein the adhesive portion is third welded to an inner perimeter surface of the can housing; and an electrode terminal fixed to a lower end of the can housing with an insulator interposed therebetween and fourth welded to the second current collector plate.

The method for inspecting a welding state of a battery of an example embodiment may further include: after the second welding determining step, a third measuring step of measuring a resistance value by contacting a probe with the first current collector plate and contacting another probe with an outer perimeter surface of the can housing; a fourth measuring step of measuring a resistance value by contacting a probe with the second current collector plate and contacting another probe with the electrode terminal; a third welding determination step of determining a state of the third welding based on the resistance value measured in the third measuring step; and a fourth welding determination step of determining a state of the fourth welding based on the resistance value measured in the fourth measuring step.

The resistance measurement in the first measuring step, the second measuring step, the third measuring step, and the fourth measuring step in the method for inspecting a welding state of a battery of an example embodiment may be carried out by a 4-wire low-resistance direct current method.

A method for manufacturing a battery of an example embodiment may include: a jelly roll forming step of forming a jelly roll by winding a sequential stack of the first current collector, the first separator, the second current collector, and the second separator; a first welding step of first welding the first current collector and the first current collector plate at an upper end of the jelly roll; a second welding step of second welding the second current collector and the second current collector plate at a lower end of the jelly roll; a first welding determining step of measuring resistance by contacting a first probe unit with an upper surface of the first current collector plate, and determining a state of the first welding based on the measured resistance value; a second welding determining step of measuring resistance by contacting a second probe unit with a lower surface of the second current collector plate, and determining a state of the second welding based on the measured resistance value; a third welding step of third welding the first current collector plate and the can housing; a fourth welding step of fourth welding the second current collector plate and the electrode terminal; a third welding determining step of measuring resistance by contacting a probe with the first current collector plate and contacting another probe with an outer perimeter surface of the can housing, and determining the third welding state based on the measured resistance value; a fourth welding determining step of measuring resistance by contacting a probe with the second current collector plate and contacting another probe with the electrode terminal, and determining the fourth welding state based on the measured resistance value; and a sealing step of injecting an electrolyte into the can housing and sealing the can housing.

DETAILED DESCRIPTION

Hereinafter, an example embodiment according to the present disclosure will be described in detail with reference to the accompanying drawings. Here, the size or shape of components shown in the drawings may be exaggerated for clarity and convenience of explanation In addition, terms specifically defined in consideration of the configuration and operation of the present disclosure may vary depending on the intention or custom of a user or operator. Definitions of these terms should be made based on the context throughout this specification.

In the description of the present disclosure, it should be noted that orientation or positional relationships indicated by the terms such as "center", "upper", "lower", "left", "right", "vertical", "horizontal", "inside", "outside", "one side", and "the other side" are based on orientation or positional relationships shown in the drawings or orientation or positional relationships usually of disposition when a product according to the present disclosure is used, are merely for the description and brief illustration of the present disclosure, and should not be construed as limiting the present disclosure because they are not suggesting or implying that the indicated apparatus or element must be configured or operated in the specified orientation with the specified orientation.

Figure 1:
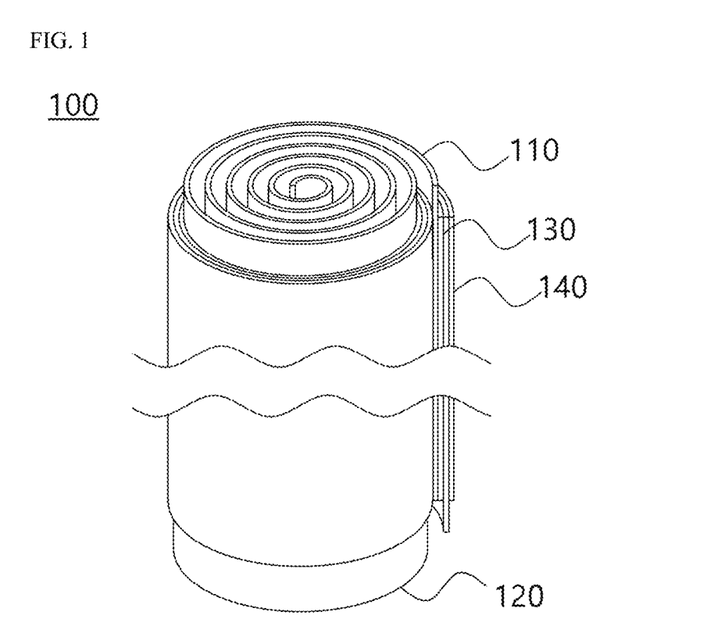
FIG. 1 is a perspective view illustrating a jelly roll.
Figure 2:
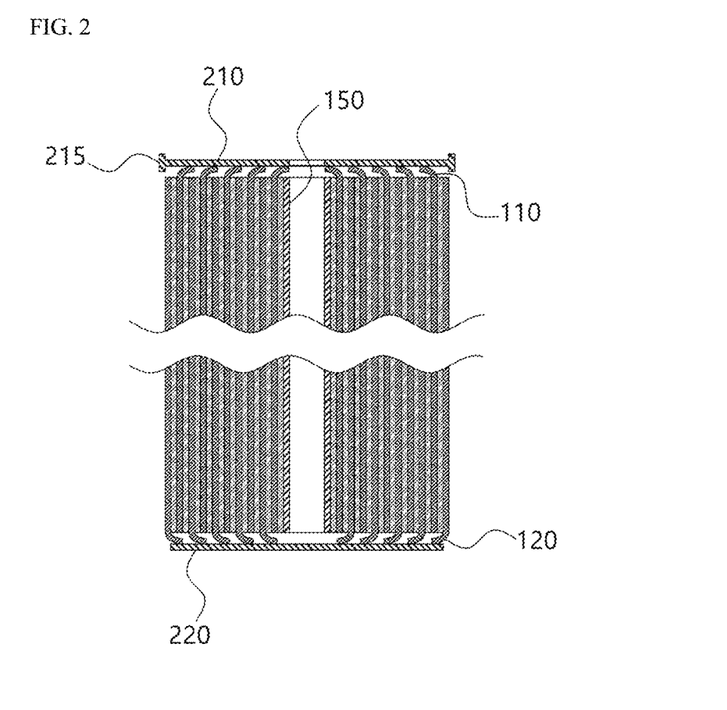
FIG. 2 is a cross-sectional view illustrating coupling between a first current collector plate, a second current collector plate, and a jelly roll.
Figure 3:
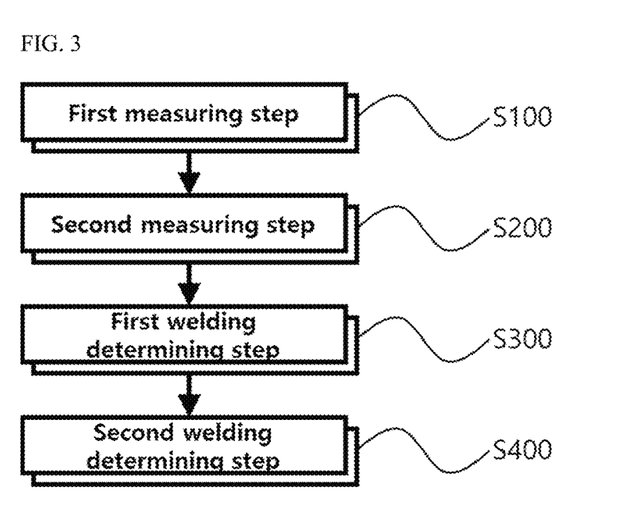
FIG. 3 is a block diagram illustrating a method for inspecting a welding state of a battery of the present disclosure.
Figure 4:
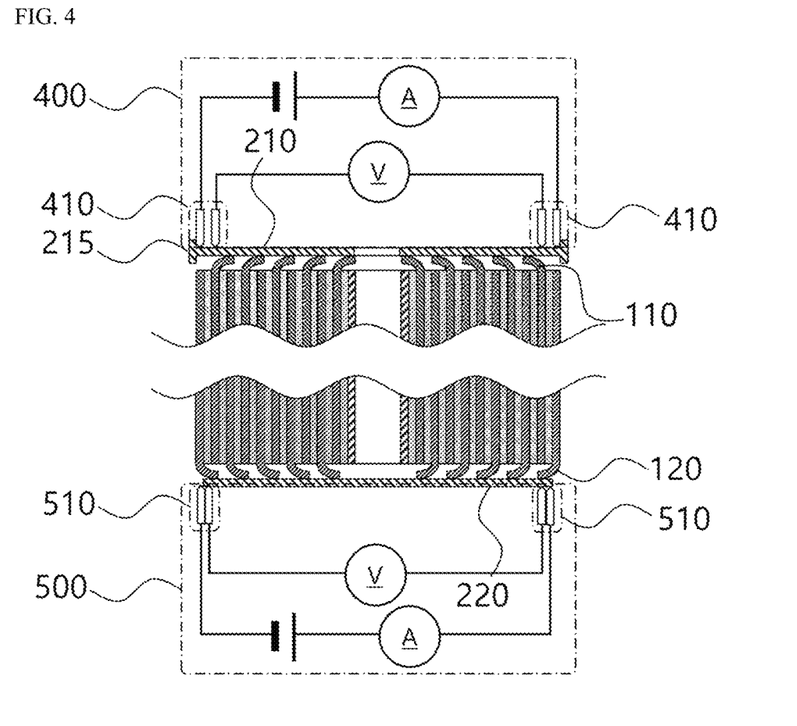
FIG. 4 is a conceptual diagram illustrating a first measuring step and a second measuring step.
Figure 5:
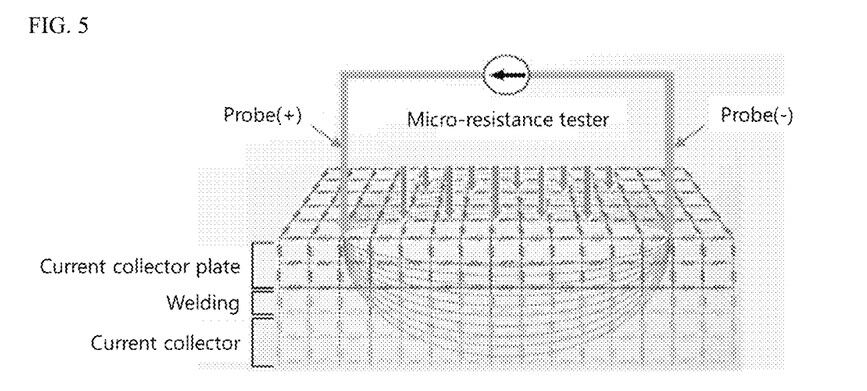
FIG. 5 is a conceptual diagram illustrating principles of a first welding determining step and a second welding determining step.
Figure 6:
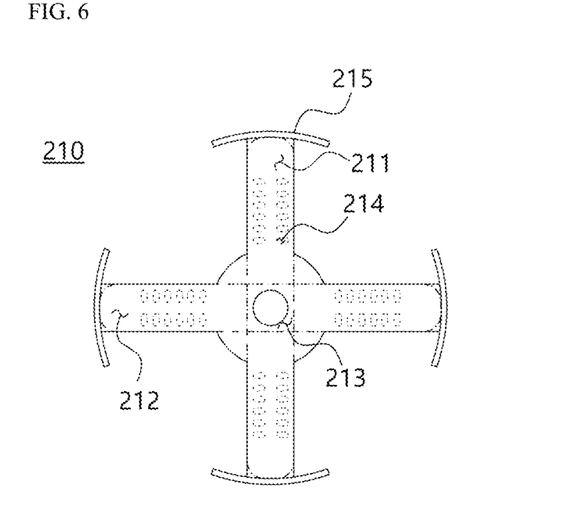
FIG. 6 is a plan view illustrating a first current collector plate.
Figure 7:
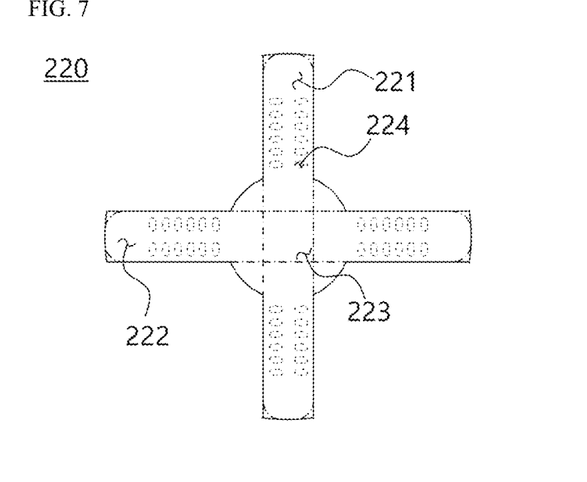
FIG. 7 is a plan view illustrating a second current collector plate.
Figure 8:
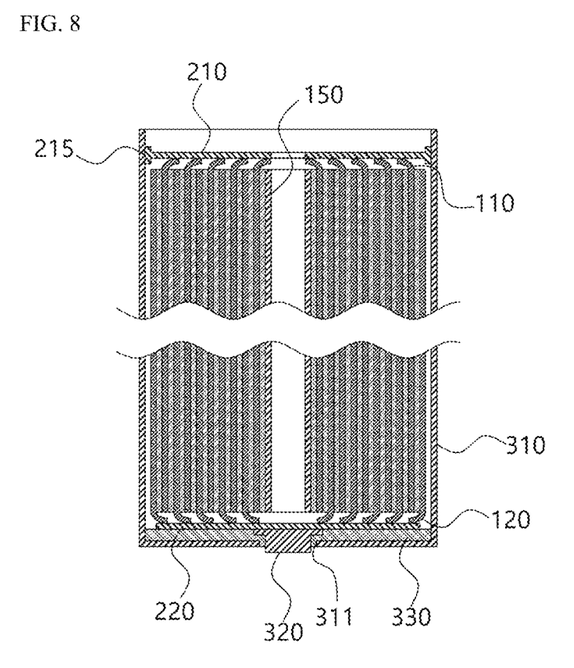
FIG. 8 is a cross-sectional view illustrating a cylindrical battery.
Figure 9:
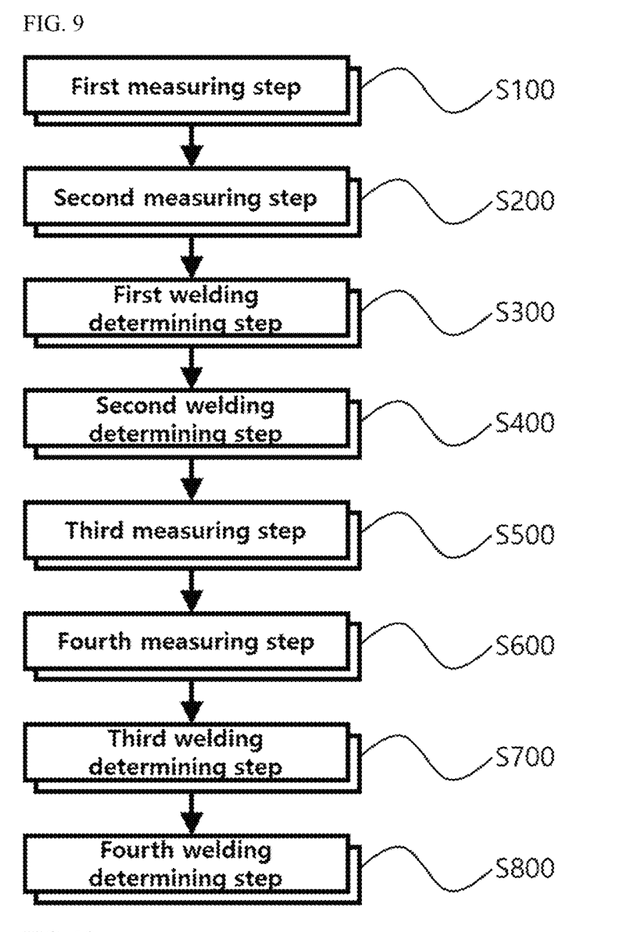
FIG. 9 is a block diagram illustrating another example embodiment of the method for inspecting a welding state of a battery of the present disclosure.
Figure 10:
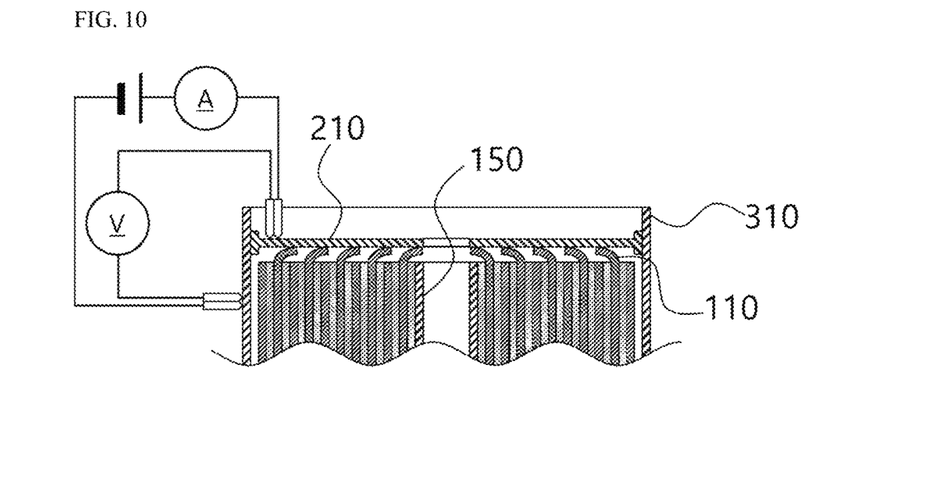
FIG. 10 is a conceptual diagram illustrating a third measuring step.
Figure 11:
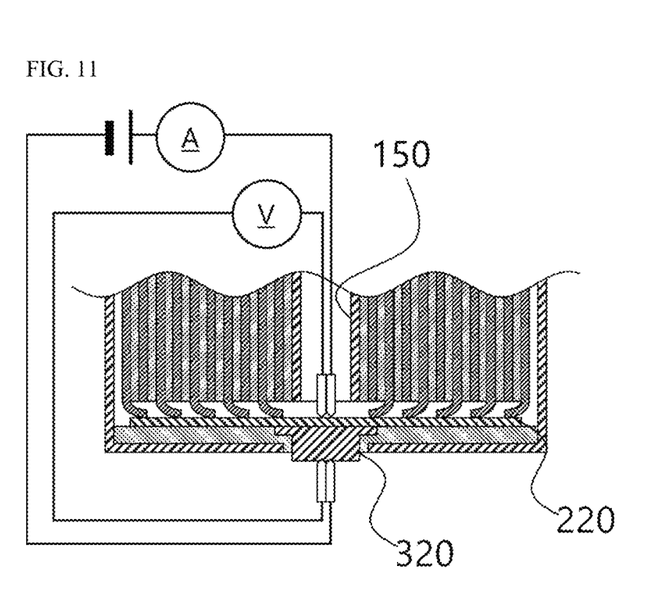
FIG. 11 is a conceptual diagram illustrating a fourth measuring step.

FIG. 1 is a perspective view illustrating a jelly roll 100. FIG. 2 is a cross-sectional view illustrating coupling between a first current collector plate 210, a second current collector plate 220, and the jelly roll. FIG. 3 is a block diagram illustrating a method for inspecting a welding state of a battery of the present disclosure. FIG. 4 is a conceptual diagram illustrating a first measuring step S100 and a second measuring step S200. FIG. 5 is a conceptual diagram illustrating principles of a first welding determining step S300 and a second welding determining step S400. FIG. 6 is a plan view illustrating a first current collector plate 210. FIG. 7 is a plan view illustrating a second current collector plate 220. FIG. 8 is a cross-sectional view illustrating a cylindrical battery. FIG. 9 is a block diagram illustrating another example embodiment of the method for inspecting a welding state of a battery of the present disclosure. FIG. 10 is a conceptual diagram illustrating a third measuring step S500. FIG. 11 is a conceptual diagram illustrating a fourth measuring step S600.

Hereinafter, the method for inspecting a welding state of a battery of the present disclosure will be described in detail with reference to FIGS. 1 to 11.

The method for inspecting a welding state of a battery of the present disclosure may be used for inspecting states of welding between parts for electrical connection in a cylindrical battery.

As shown in FIGS. 1 and 2, a cylindrical battery subject to inspection according the method for inspecting a welding state of a battery of the present disclosure may include a jelly roll 100 having a cylindrical shape and extending in a vertical direction with a first current collector 110, a first separator 130, a second current collector 120, and a second separator 140 being stacked sequentially and wound; a first current collector plate 210 coupled to an upper end of the jelly roll 100, wherein the first current collector 110 is first welded to a lower surface of the first current collector plate 210; and a second current collector plate 220 coupled to a lower end of the jelly roll 100, wherein the second current collector 120 is second welded to an upper surface of the second current collector plate 220.

In other words, as shown in FIG. 1, the jelly roll 100 may be provided in a cylindrical shape with the vertical direction being a central axis, and an upper end of the first current collector 110 may protrude higher than upper ends of the second current collector 120, the first separator 130, and the second separator 140, and a lower end of the second current collector 120 may protrude lower than lower ends of the first current collector 110, the first separator 130, and the second separator 140.

The first current collector 110 may be an anode current collector or a cathode current collector coated with an anode active material or a cathode active material. When the first current collector 110 is an anode current collector, the second current collector 120 may be a cathode current collector, and when the first current collector 110 is a cathode current collector, the second current collector 120 may be an anode current collector.

As shown in FIG. 2, the first current collector plate 210 and the second current collector plate 220 may be provided as plates in the shape of planes that are perpendicular to the vertical direction. The upper end of the first current collector 110 may be first welded to the lower surface of the first current collector 210 with a tilt angle, and the lower end of the second current collector 120 may be second welded to the upper surface of the second current collector 220 at a tilt angle.

The first welding and the second welding may be laser welding, ultrasonic welding, resistance welding, or the like.

As shown in FIG. 3, the method for inspecting a welding state of a battery of the present disclosure may include:
a first measuring step S100 of measuring resistance by contacting a first probe unit 400 with an upper surface of the first current collector plate 210;
a second measuring step S200 of measuring resistance by contacting a second probe unit 500 with a lower surface of the second current collector plate 220;
a first welding determining step S300 of determining a state of the first welding with the resistance value measured in the first measuring step S100; and
a second welding determining step S400 of determining a state of the second welding with the resistance value measured in the second measuring step S200.

The first measuring step S100 and the second measuring step S200 may be performed before the jelly roll 100 is inserted into the can housing 310 after the current collectors and the current collector plates are welded during the manufacture of the battery.

As shown in FIG. 4, in the first measuring step S100, the first probe unit 400 may be in contact with a side of the first current collector plate 210 that is opposite to the side where the first current collector 110 and the first current collector plate 210 contact each other, and in the second measuring step S200, the second probe unit 500 may be in contact with a side of the second current collector plate 220 that is opposite to the side where the second current collector 120 and the second current collector plate 220 contact each other, thereby allowing for measuring resistance values. As shown in FIG. 5, even when resistance values are measured by contacting the probes with the opposite side of the welded side, a welding state of the side opposite to the measured side may be identified by analyzing the resistance values, because the welding state affects the resistance seen by the probes. In a cylindrical battery subject to the method for inspecting a welding state of a battery of the present disclosure, materials of the first current collector plate 210 and the second current collector plate 220 may be selected from aluminum, nickel, copper, and combinations thereof. The first current collector plate 210 and the second current collector plate 220 may be formed with a thickness ranging from 0.2 T to 0.4 T. Therefore, the welding state may be well reflected in the resistance values measured by contacting the probes to the side opposite to the welded side.

In the method for inspecting a welding state of a battery of the present disclosure, the first probe unit 400 may include a plurality of first probes 410 provided in a plurality of pairs, and the second probe unit 500 may include a plurality of second probes 510 provided in a plurality of pairs, wherein in the first measuring step S100, the plurality of first probes 410 contact different respective points of the first current collector plate 210 to measure resistance values, and in the second measuring step S200, the plurality of second probes 510 contact different respective points of the second current collector plate 220 to measure resistance values.

A pair of first probes 410 may be provided to include one anode probe and one cathode probe, and a pair of second probes 510 may also be provided to include one anode probe and one cathode probe.

Each of the plurality of pairs of first probes 410 may contact different respective points such that a first welding region 214 is interposed between the anode probe and the cathode probe, and each of the plurality of pairs of second probes 510 may contact different respective points such that a second welding region 224 is interposed between the anode probe and the cathode probe.

As shown in FIGS. 6 and 7, in a cylindrical battery subject to the method for inspecting a welding state of a battery of the present disclosure, the first current collector plate 210 may be provided in a cross shape in which a first linear region 211 and a second linear region 212 intersect with each other, and the second current collector plate 220 may be provided in a cross shape in which a third linear region 221 and a fourth linear region 222 intersect with each other.

In this case, a region in which the first linear region 211 and the second linear region 212 overlap may be defined as a first intersection region 213, and a region in which the third linear region 221 and the fourth linear region 222 overlap may be defined as a second intersection region 223, wherein in the first measuring step S100, at least a pair of first probes 410 among the plurality of first probes 410 may measure a first resistance value by contacting the first linear region 211 with the first intersection region 213 interposed therebetween, and at least another pair of first probes 410 among the plurality of first probes 410 may measure a second resistance value by contacting the second linear region 212 with the first intersection region 213 interposed therebetween, and wherein in the second measuring step S200, at least a pair of second probes 510 among the plurality of second probes 510 may measure a third resistance value by contacting the third linear region 221 with the second intersection region 223 interposed therebetween, and at least another pair of second probes 510 among the plurality of second probes 510 may measure a fourth resistance value by contacting the fourth linear region 222 with the second intersection region 223 interposed therebetween.

Specifically, the pair of first probes 410 may contact the first linear region 211 with the first welding region 214 and the first intersection region 213 interposed therebetween, and more specifically, the pair of first probes 410 may contact both ends of the first linear region 211. The another pair of first probes 410 may also contact the second linear region 212 with the first welding region 214 and the first intersection region 213 interposed therebetween, and more specifically, the another pair of first probes 410 may contact both ends of the second linear region 212.

The pair of second probes 510 may contact the third linear region 221 with the second welding region 224 and the second intersection region 223 interposed therebetween, and more specifically, the pair of second probes 510 may contact both ends of the third linear region 221. The another pair of second probes 510 may also contact the fourth linear region 222 with the second welding region 224 and the second intersection region 223 interposed therebetween, and more specifically, the another pair of second probes 510 may contact both ends of the fourth linear region 222.

In the first welding determining step S300, a state of the first welding may be determined based on the first resistance value and the second resistance value, and in the second welding determining step S400, a state of the second welding may be determined based on the third resistance value and the fourth resistance value. By combining the first resistance value and the second resistance value, an overall state of the first welding may be identified, and a welding state of a local region in the first welding region 214 may also be identified individually as an independent value as needed. By combining the third resistance value and the fourth resistance value, an overall state of the second welding may be identified, and a welding state of a local region in the second welding region 224 may also be identified individually as an independent value as needed.

As shown in FIG. 4, the resistance measurement in the first measuring step S100 and the second measuring step S200 may be carried out by a 4-wire low-resistance direct current method. The anode probe and the cathode probe may include a terminal connected to an ammeter and a terminal connected to a voltmeter, respectively.

The method for inspecting a welding state of a battery of the present disclosure may need to accurately measure resistance values of 1Ω or less, and to this end, it may be preferable to utilize a 4-wire low-resistance direct current method which may minimize the influence of any wiring resistance or contact resistance.

As shown in FIG. 8, in the method for inspecting a welding state of a battery of the present disclosure, an arc-shaped adhesive portion 215 may be provided on an edge of the first current collector plate 210, and the cylindrical battery may further include a can housing 310 configured to house the jelly roll 100 inside, wherein the adhesive portion 215 is third welded to an inner perimeter surface of the can housing 310; and an electrode terminal 320 fixed to a lower end of the can housing 310 with an insulator 330 interposed therebetween and fourth welded to the second current collector plate 220.

The can housing 310 may have a cylindrical shape with an open upper end, and the jelly roll 100 may be inserted into the upper end. An opening 311 may be formed at a lower end of the can housing 310 such that the electrode terminal 320 may be exposed to the outside of the can housing 310 through the opening 311 while contacting with the second current collector 220 therein at the same time.

As shown in FIG. 9, the method for inspecting a welding state of a battery of the present disclosure may further include:
    after the second welding determining step S400,
    a third measuring step S500 of measuring a resistance value by contacting a probe with the first current collector plate 210 and contacting another probe with an outer perimeter surface of the can housing 310;
    a fourth measuring step S600 of measuring a resistance value by contacting a probe with the second current collector plate 220 and contacting another probe with the electrode terminal 320;
    a third welding determination step S700 of determining a state of the third welding based on the resistance value measured in the third measuring step S500; and
    a fourth welding determination step S800 of determining a state of the fourth welding based on the resistance value measured in the fourth measuring step S600.

As shown in FIG. 10, in the third measuring step S500, a resistance value may be measured by contacting a probe with the first current collector plate 210 and contacting another probe with an outer perimeter surface of the can housing 310. In the third measuring step S500, the cathode probe and the anode probe may be disposed such that the first welding region 214 is not located between the cathode probe and the anode probe.

As shown in FIG. 11, a resistance value may be measured by contacting a probe with the second current collector plate 220 and contacting another probe with the electrode terminal 320. Specifically, the resistance value may be measured by contacting a probe with the upper surface of the second current collector plate 220 through a central tube 150 located on a central axis of the jelly roll 100, and contacting another probe with a lower end of the electrode terminal 320 from the outside of the can housing.

In the third measuring step S500 and the fourth measuring step S600, the resistance measurement may also be carried out by a 4-wire low-resistance direct current method.

A method for manufacturing a battery using the method for inspecting a welding state of a battery of the present disclosure may include:
    a jelly roll 100 forming step of forming a jelly roll 100 by winding a sequential stack of the first current collector 110, the first separator 130, the second current collector 120, and the second separator 140;

a first welding step of first welding the first current collector 110 and the first current collector plate 210 at an upper end of the jelly roll 100;

a second welding step of second welding the second current collector 120 and the second current collector plate 220 at a lower end of the jelly roll 100;

a first welding determining step of measuring resistance by contacting a first probe unit 400 with an upper surface of the first current collector plate 210 and determining a state of the first welding based on the measured resistance value;

a second welding determining step of measuring resistance by contacting a second probe unit 500 with a lower surface of the second current collector plate 220 and determining a state of the second welding based on the measured resistance value;

a third welding step of third welding the first current collector plate 210 and the can housing 310;

a fourth welding step of fourth welding the second current collector plate 220 and the electrode terminal 320;

a third welding determining step of measuring resistance by contacting a probe with the first current collector plate 210 and contacting another probe with an outer perimeter surface of the can housing 310, and determining the third welding state based on the measured resistance value;

a fourth welding determining step of measuring resistance by contacting a probe with the second current collector plate 220 and contacting another probe with the electrode terminal 320, and determining the fourth welding state based on the measured resistance value; and a sealing step of injecting an electrolyte into the can housing 310 and sealing the can housing 310.

According to the method for manufacturing a battery of an example embodiment, resistance values of welding sites are measured in-between each process, and the corresponding welding states are identified immediately, thereby preventing defective products from proceeding to the final process in advance, and inspecting welding states of each part individually without destroying the battery.

Although the example embodiments according to the present disclosure have been described above, these are merely exemplary, and those skilled in the art will understand that various modifications and equivalent ranges of the example embodiments are possible therefrom. Accordingly, the scope for true technical protection of the present disclosure should be defined by the appended claims.

[Explanation of Symbols]

| 100 | Jelly roll | 110 | First current collector |
|---|---|---|---|
| 120 | Second current collector | 130 | First separator |
| 140 | Second separator | 150 | Central tube |
| 210 | First current collector plate | 211 | First linear region |
| 212 | Second linear region | 213 | First intersection region |
| 214 | First welding region | 215 | Adhesive portion |
| 220 | Second current collector plate | 221 | Third linear region |
| 222 | Fourth linear region | 223 | Second intersection region |
| 224 | Second welding region | 310 | Can housing |
| 311 | Opening | 320 | Electrode terminal |
| 330 | Insulator | 400 | First probe unit |
| 410 | First probe | 500 | Second probe unit |
| 510 | Second probe | | |

INDUSTRIAL APPLICABILITY

According to a method for inspecting a welding state of a battery of example embodiments of the present disclosure, it is possible to perform in-line total inspection, thereby improving the quality of battery production and removing defective batteries in advance.

According to a method for inspecting a welding state of a battery of example embodiments of the present disclosure, it is possible to identify welding qualities within a short time period.

What is claimed is:

1. A method for inspecting a welding state of a battery, wherein the battery is a cylindrical battery comprising:

a jelly roll having a cylindrical shape and extending in a vertical direction, the jelly roll comprising a first current collector, a first separator, a second current collector, and a second separator being stacked sequentially and wound;

a first current collector plate coupled to an upper end of the jelly roll, wherein the first current collector is welded, by first welding, to a lower surface of the first current collector plate; and a second current collector plate coupled to a lower end of the jelly roll, wherein the second current collector is welded, by second welding, to an upper surface of the second current collector plate, and wherein the method comprises:

measuring first resistance by contacting a first probe unit with an upper surface of the first current collector plate;

measuring second resistance by contacting a second probe unit with a lower surface of the second current collector plate;

determining a state of the first welding based on a resistance value measured in measuring the first resistance; and determining a state of the second welding based on a resistance value measured in measuring the second resistance.

2. The method of claim 1, wherein the first probe unit comprises a plurality of first probes provided in a plurality of pairs, and the second probe unit comprises a plurality of second probes provided in a plurality of pairs, and wherein, in measuring the first resistance, the plurality of first probes measure resistance values by contacting different respective points of the first current collector plate, and in measuring the second resistance, the plurality of second probes measure resistance values by contacting different respective points of the second current collector plate.

3. The method of claim 2, wherein the first current collector plate is provided in a cross shape in which a first linear region and a second linear region intersect with each other, and the second current collector plate is provided in a cross shape in which a third linear region and a fourth linear region intersect with each other, wherein a region in which the first linear region and the second linear region overlap is defined as a first intersection region, and a region in which the third linear region and the fourth linear region overlap is defined as a second intersection region, wherein in measuring the first resistance, at least one pair of first probes among the plurality of first probes measure a first resistance value by contacting the first linear region with the first intersection region, wherein the first intersection region is interposed between ends of the first linear region, and at least another pair of first probes among the plurality of first probes measure a second resistance value by contacting the second linear region with the first intersection region, wherein the first intersection region is interposed between two ends of the second linear region, and wherein in measuring the second resistance, at least a pair of second probes among the plurality of second probes measure a third resistance value by contacting the third linear region with the second intersection region, wherein the second intersection region is interposed between two ends of the third linear region, and at least another pair of second probes among the plurality of second probes measure a fourth resistance value by contacting the fourth linear region with the second intersection region, wherein the second intersection region is interposed between two ends of the fourth linear region.

4. The method of claim 3, wherein in determining the state of the first welding, the state of the first welding is determined based on the first resistance value and the second resistance value, and in determining the state of the second welding, the state of the second welding is determined based on the third resistance value and the fourth resistance value.

5. The method of claim 1, wherein an arc-shaped adhesive portion is provided at an edge of the first current collector, wherein the cylindrical battery further comprises:

a can housing configured to house the jelly roll within the can housing, the arc-shaped adhesive portion being welded, by third welding, to an inner perimeter surface of the can housing; and an electrode terminal fixed to a lower end of the can housing with an insulator, the insulator being disposed between the electrode terminal and the can housing, the electrode terminal being welded, by fourth welding, to the second current collector plate, and wherein the method further comprises: after determining the state of the second welding, measuring third resistance by contacting a probe with the first current collector plate and contacting another probe with an outer perimeter surface of the can housing;

measuring fourth resistance by contacting a probe with the second current collector plate and contacting another probe with the electrode terminal;

determining a state of the third welding based on a resistance value measured in measuring the third resistance; and determining a state of the fourth welding based on a resistance value measured in measuring the fourth resistance.

6. The method of claim 5, wherein measuring the first resistance, measuring the second resistance, measuring the third resistance, and measuring the fourth resistance are carried out by a 4-wire low-resistance direct current method.

7. A method for manufacturing a cylindrical battery, comprising:

forming a jelly roll by winding a sequential stack of a first current collector, a first separator, a second current collector, and a second separator;

first welding the first current collector and a first current collector plate at an upper end of the jelly roll;

second welding the second current collector and a second current collector plate at a lower end of the jelly roll;

measuring first resistance by contacting a first probe unit with an upper surface of the first current collector plate, and determining a state of the first welding based on the measured first resistance;

measuring second resistance by contacting a second probe unit with a lower surface of the second current collector plate, and determining a state of the second welding based on the measured second resistance;

third welding the first current collector plate and a can housing;

fourth welding the second current collector plate and an electrode terminal;

measuring third resistance by contacting a probe with the first current collector plate and contacting another probe with an outer perimeter surface of the can housing, and determining a state of the third welding based on the measured third resistance;

measuring fourth resistance by contacting a probe with the second current collector plate and contacting another probe with the electrode terminal, and determining a state of the fourth welding based on the measured fourth resistance; and injecting an electrolyte into the can housing and sealing the can housing.

* * * * *